United States Patent
Hatakeyama et al.

(10) Patent No.: US 10,753,489 B2
(45) Date of Patent: Aug. 25, 2020

(54) ELECTRONIC FAUCET DEVICE

(71) Applicant: TOTO LTD., Kitakyushu-shi, Fukuoka (JP)

(72) Inventors: Makoto Hatakeyama, Kitakyushu (JP); Hideyuki Matsui, Kitakyushu (JP); Masanobu Kanashiro, Kitakyushu (JP)

(73) Assignee: TOTO LTD., Kitakyushu-shi, Fukuoka (JP)

( * ) Notice: Subject to any disclaimer, the term of this patent is extended or adjusted under 35 U.S.C. 154(b) by 48 days.

(21) Appl. No.: 16/137,021

(22) Filed: Sep. 20, 2018

(65) Prior Publication Data

US 2019/0101219 A1    Apr. 4, 2019

(30) Foreign Application Priority Data

Sep. 29, 2017 (JP) ................................. 2017-190667
Sep. 29, 2017 (JP) ................................. 2017-190669

(51) Int. Cl.
*F16K 11/14* (2006.01)
*E03C 1/05* (2006.01)
(Continued)

(52) U.S. Cl.
CPC ............ *F16K 11/14* (2013.01); *E03C 1/0412* (2013.01); *E03C 1/057* (2013.01); *F16K 31/04* (2013.01); *F16K 31/605* (2013.01)

(58) Field of Classification Search
CPC ........ F16K 11/14; F16K 31/04; F16K 31/605; E03C 1/057
(Continued)

(56) References Cited

U.S. PATENT DOCUMENTS 8,408,517 B2    4/2013 Jonte et al.
9,032,565 B2 *  5/2015 Loeck et al. ............ E03C 1/057
                                                              4/623
(Continued)

FOREIGN PATENT DOCUMENTS

JP    2003138619 A    5/2003
JP    2009-127379 A   6/2009
(Continued)

OTHER PUBLICATIONS

European Search Report issued in European Patent Application No. 18196940.3 dated Feb. 22, 2019.

*Primary Examiner* — Kevin L Lee
(74) *Attorney, Agent, or Firm* — BakerHostetler

(57) ABSTRACT

An electronic faucet device includes a water discharge port for discharging water mixed at a faucet main body; a valve for electrically opening and closing a passage on an upstream side of the water discharge port; a first operation unit and a second operation unit for opening and closing the valve; and a control unit for controlling the valve based on an electrical signal transmitted from each of the first and second operation units, in a case where a water discharge and stop operation is performed on one operation unit among the first operation unit and the second operation unit in a state where the water discharge and stop operation is performed on the other operation unit, the control unit controls the valve by prioritizing an electrical signal transmitted from the one operation unit so as to enable discharge and stopping of water at the water discharge port.

12 Claims, 8 Drawing Sheets

(51) Int. Cl.
  *E03C 1/04* (2006.01)
  *F16K 31/04* (2006.01)
  *F16K 31/60* (2006.01)

(58) Field of Classification Search
  USPC .......................................................... 4/623
  See application file for complete search history.

(56) References Cited

U.S. PATENT DOCUMENTS

| | | |
|---|---|---|
| 2014/0352799 A1* | 12/2014 | Rosko et al. ............. C02F 1/78 |
| | | 137/237 |
| 2015/0052677 A1* | 2/2015 | Chen ....................... E03C 1/057 |
| | | 4/623 |
| 2016/0208467 A1 | 7/2016 | Song |
| 2017/0275860 A1 | 9/2017 | Beck |

FOREIGN PATENT DOCUMENTS

| | | |
|---|---|---|
| JP | 2014-15781 A | 1/2014 |
| JP | 2014-118798 A | 6/2014 |
| JP | 2015190204 A | 11/2015 |

\* cited by examiner

ELECTRONIC FAUCET DEVICE

BACKGROUND OF THE INVENTION

The present invention relates to an electronic faucet device, and more particularly, to an electronic faucet device configured to discharge and stop water in which the temperature and flow rate are adjusted based on electrical signals.

As an electronic faucet device for discharging and stopping water, the temperature and flow rate of which are adjusted based on electrical signals, an electronic faucet device which is a hybrid of an automatic faucet and a manual faucet is conventionally known, as described in Patent Literature 1 (Japanese Patent Laid-Open No. 2014-15781).

The conventional electronic faucet device described in Patent Literature 1 includes two operation units which enable a touch operation by an operation button and a manual lever operation by a single lever, respectively. Accordingly, the two operation units may be operated according to the use states, and when each operation unit is operated, a solenoid valve for supplying hot water or a solenoid valve for supplying cold water is opened and closed, and a water discharge unit is enabled to discharge and stop water.

However, with the conventional electronic faucet device described in Patent Literature 1, when a user performs a water discharge operation by operation (such as a touch operation using a push button) of one of the two operation units, each allowing a touch operation or a lever operation, in a state where the solenoid valve is closed by operation (such as a lever operation using a single lever) of the other operation unit, a water-stopped state is maintained and water discharge is not started, and there is a problem that the user becomes confused.

Accordingly, there is a demand to achieve an electronic faucet device with increased operability, which is easy to use and which does not cause confusion to a user at the time of operation.

The present invention has been made to meet the demand described above, and has its object to provide an electronic faucet device with increased operability, which is easy to use and which does not cause confusion to a user at the time of operation.

SUMMARY OF THE INVENTION

To achieve the object described above, the present invention is an electronic faucet configured to discharge and stop water in which a flow rate and a temperature are adjusted based on electrical signals, the electronic faucet device including: a hot water passage through which hot water (heated water) is supplied from a hot water supply; a cold water passage through which cold water (non-heated water) is supplied from a cold water supply; a faucet main body for mixing the hot water and the cold water supplied from the hot water passage and the cold water passage, respectively; a water discharge port for discharging water mixed at the faucet main body; an electric opening and closing valve configured to electrically open and close a passage on an upstream side of the water discharge port; a first operation unit and a second operation unit configured to open and close the opening and closing valve; and a control unit for controlling the opening and closing valve based on an electrical signal transmitted from each of the first operation unit and the second operation unit, where in a case where a water discharge and stop operation is performed on one operation unit among the first operation unit and the second operation unit in a state where the water discharge and stop operation is performed on the other operation unit, the control unit controls the opening and closing valve by prioritizing an electrical signal transmitted from the one operation unit so as to enable discharge and stopping of water at the water discharge port.

According to the present invention described above, in a case where a water discharge and stop operation is performed on one operation unit among the first operation unit and the second operation unit in a state where a water discharge and stop operation is performed on the other operation unit, the control unit may control the opening and closing valve by prioritizing an electrical signal transmitted from the one operation unit, and water may be reliably discharged or stopped at the water discharge port.

Accordingly, for example, in the case where discharge of water from the water discharge port is desired to be started, discharge of water can be reliably started even in a state where a water stop operation is performed on one operation unit among the first operation unit and the second operation unit, by performing a water discharge operation on the other operation unit.

Accordingly, a user having a water discharge operation in mind may certainly cause water to be discharged by operating either of the first operation unit and the second operation unit. The user may thus be prevented from becoming confused due to intended discharge of water not being performed in spite of a water discharge operation performed by the user.

The electronic faucet device with increased operability, which is easy to use and which does not cause confusion to a user at the time of operation may thereby be provided.

In the present invention, preferably, the first operation unit allows an adjustment operation regarding a flow rate of water that is discharged from the water discharge port, and in a case of determining that a signal indicating an operation for opening the opening and closing valve is input by a water discharge operation on the second operation unit in a state where a water discharge flow rate of the water discharge port is set to zero by a water stop operation on the first operation unit, the control unit causes discharge of water from the water discharge port to be started at a predetermined flow rate that is set in advance.

According to the present invention described above, the flow rate of water that is discharged from the water discharge port can be adjusted by operation of the first operation unit, but even in a case where the water discharge flow rate is set to zero by a water stop operation on the first operation unit, discharge of water from the water discharge port may be reliably started at a predetermined flow rate which is set in advance, when the control unit determines that a signal indicating an operation for opening the opening and closing valve is input by a water discharge operation on the second operation unit.

Accordingly, even in a case where the water discharge flow rate is set to zero by a water stop operation on the first operation unit, a user having discharge of water in mind may certainly cause water to be discharged, by performing a water discharge operation on the second operation unit. The user may thus be prevented from becoming confused due to intended discharge of water not being performed in spite of a water discharge operation performed by the user.

In the present invention, preferably, the first operation unit further allows an adjustment operation regarding a temperature of water that is discharged from the water discharge port, and in a case of determining that a signal indicating an operation for opening the opening and closing valve is input by a water discharge operation on the second operation unit in a state where a water discharge flow rate of the water discharge port is set to zero by a water stop operation on the first operation unit, the control unit causes discharge of water from the water discharge port to be started at a temperature set by the first operation unit.

According to the present invention described above, the temperature of water that is discharged from the water discharge port can be adjusted by operation of the first operation unit. Even in a case where the water discharge flow rate is set to zero by a water stop operation on the first operation unit, discharge of water from the water discharge port may be started at a temperature that is set by the first operation unit, when the control unit determines that a signal indicating an operation for opening the opening and closing valve is input by a water discharge operation on the second operation unit.

At this time, a water discharge temperature at the water discharge port can be predicted to a certain degree by looking at the operation position of the first operation unit. Because discharge of water from the water discharge port may be started at a temperature set by the first operation unit, a difference between the predicted water discharge temperature and the actual water discharge temperature may be suppressed, and a user may be prevented from feeling a sense of discomfort.

In the present invention, preferably, the control unit further includes a flow rate setting change device that enables setting of the predetermined flow rate that is set in advance to be changed.

According to the present invention described above, when the water discharge flow rate at the water discharge port is zero due to a water stop operation on the first operation unit, discharge of water from the water discharge port may be reliably started at a predetermined flow rate which is set in advance, by a water discharge operation on the second operation unit.

At this time, there are various demands with respect to the water discharge flow rate depending on the use state and the preference of a user, but because a predetermined flow rate set in advance for discharge of water from the water discharge port may be changed by the flow rate setting change device of the control unit, a water discharge flow rate according to the use state or the preference of a user may be set.

The usability can thereby be increased.

In the present invention, preferably, in a case of determining that a water discharge operation is performed on the first operation unit after discharge of water at the predetermined flow rate that is set in advance is started by a water discharge operation on the second operation unit, the control unit is capable of changing the flow rate or a temperature of water that is discharged, by prioritizing a signal that is transmitted from the first operation unit.

According to the present invention described above, when the first operation unit is operated after the second operation unit is operated, the signal transmitted from the first operation unit is prioritized, and the flow rate or temperature of discharged water may be reliably changed.

Accordingly, in the case where a water discharge operation is performed on the first operation unit after discharge of water at a predetermined flow rate which is set in advance is started by a water discharge operation on the second operation unit, a situation where the flow rate or temperature of discharged water is not changed even though a water discharge operation is performed on the first operation unit may be prevented, and a user may be prevented from feeling a sense of discomfort.

Water may thus be discharged at a flow rate or temperature intended by a user, and the usability may be increased.

In the present invention, preferably, the second operation unit includes a detection unit for detecting an object, the control unit causes discharge of water from the water discharge port to be continued in a state where the object is detected by the detection unit, and stops water in a state where the object is no longer detected by the detection unit, and in a case of determining that a water discharge operation is performed on the first operation unit in a state where discharge of water from the water discharge port at the predetermined flow rate that is set in advance is started by operation on the second operation unit, the control unit causes discharge of water from the water discharge port to be continued even in a state where the object is no longer detected by the detection unit.

According to the present invention described above, after discharge of water at a predetermined flow rate is started by the second operation unit, if a water discharge operation is further performed on the first operation unit in a state where water is being discharged from the water discharge port, a signal indicating a water discharge operation is input from the first operation unit to the control unit. At this time, even if the detection unit of the second operation unit no longer detects an object, and a signal indicating a water stop operation is input from the second operation unit to the control unit, the control unit may prioritize the signal indicating a water discharge operation from the first operation unit, and discharge of water may be continued.

Accordingly, water may be prevented from being unintentionally stopped for a user who operated the first operation unit with the intention of continuing discharge of water, and the usability is high.

In the present invention, preferably, in a case where a water stop operation is performed on one of the first operation unit and the second operation unit in a state where water is being discharged from the water discharge port, the control unit causes the opening and closing valve to be closed.

According to the present invention described above, in the case where a water stop operation is performed on one of the first operation unit and the second operation unit in a state where water is being discharged from the water discharge port, the opening and closing valve may be reliably closed.

Accordingly, a situation may be prevented where a user intending to stop water cannot stop water even though the user is performing a water stop operation on one operation unit among the first operation unit and the second operation unit, and the user may be prevented from feeling a sense of discomfort.

Furthermore, in the case where water is intended to be stopped, water may be reliably stopped by performing a water stop operation on either of the first operation unit and the second operation unit, and thus, the usability is increased, and also, water is not wasted and water-saving can be achieved.

In the present invention, preferably, the first operation unit allows an adjustment operation regarding a flow rate of water that is discharged from the water discharge port, and in a case where a signal indicating an operation for opening the opening and closing valve is input from the first operation unit in a state where a signal indicating an operation for closing the opening and closing valve is input from the second operation unit and the opening and closing valve is closed, the control unit determines that a water discharge operation is performed on the first operation unit, and causes discharge of water from the water discharge port to be started.

According to the present invention described above, even in a state where a signal indicating an operation for closing the opening and closing valve is input from the second operation unit to the control unit, if a signal indicating an operation for opening the opening and closing valve is then input from the first operation unit, it is determined that a water discharge operation is performed on the first operation unit, and discharge of water from the water discharge port may be reliably started.

A user with a water discharge operation in mind may thus be prevented from becoming confused due to discharge of water not being started in spite of the user performing a water discharge operation on the first operation unit in a state where a water stop operation is performed on the second operation unit.

Accordingly, a user who is not used to the electronic faucet device including two operation units, the first operation unit and the second operation unit, may certainly cause water to be discharged as intended and without becoming confused, by performing a water discharge operation on the first operation unit, and the usability is high.

The electronic faucet device with increased operability, which is easy to use and which does not cause confusion to a user at the time of operation may thereby be provided.

In the present invention, preferably, in a case of determining that an amount of operation of the first operation unit is at or greater than a predetermined value, the control unit causes discharge of water from the water discharge port to be started.

According to the present invention described above, in the case where the amount of operation of the first operation unit is determined by the control unit to be at or greater than the predetermined value, it is determined that a water discharge operation is intended by the user, and discharge of water from the water discharge port may be reliably started.

In the case where the amount of operation of the first operation unit is smaller than the predetermined value, it is determined that the first operation unit is only slightly moved due to occurrence of vibration in the periphery, for example, and that the user is not intentionally performing a water discharge operation, and discharge of water may be prevented from being started.

Accordingly, water may be reliably prevented from being erroneously discharged by an unintentional water discharge operation on the first operation unit.

In the present invention, preferably, the control unit is configured such that, in a case where the first operation unit is set in a high flow rate region in which a water discharge flow rate of the water discharge port is at or higher than a predetermined flow rate, an increase in the water discharge flow rate of the water discharge port per unit time, from start of discharge of water, is reduced compared to an increase in the flow rate where setting is in a low flow rate region.

According to the present invention described above, in the case where the first operation unit is set in the high flow rate region in which the water discharge flow rate of the water discharge port is at or higher than the predetermined flow rate, the control unit may perform control such that an increase in the water discharge flow rate of the water discharge port per unit time, from the start of discharge of water, is set smaller than in a case where setting is in the low flow rate region.

Accordingly, at the time of start of discharge of water, water may be prevented from being discharged at a high flow rate due to the first operation unit being set in the high flow rate region. A user may thereby be prevented from being surprised due to sudden start of discharge of water at an unexpectedly high flow rate, and also, reduction in the usability due to splashing of water may be prevented.

In the present invention, preferably, the first operation unit increases a water discharge flow rate of the water discharge port by being operated in one direction, and reduces the water discharge flow rate by being operated in the other direction, and in a case where the first operation unit is determined to be operated in only the one direction, and the first operation unit is operated by a predetermined distance or more, the control unit causes discharge of water from the water discharge port to be started.

According to the present invention described above, when vibration occurring in the periphery or the like is transmitted to the first operation unit, the first operation unit is possibly moved by the vibration in the one direction or in the other direction.

However, at this time, discharge of water from the water discharge port may be started by a water discharge operation on the first operation unit intended by the user, in the case where it is determined by the control unit that the first operation unit is moved only in one direction, and where the first operation unit is operated by the predetermined distance or more.

Accordingly, even when the first operation unit is operated in one direction, if the first operation unit is not moved by the predetermined distance or more, it can be determined that the first operation unit is only slightly moved unintentionally by vibration or the like, by less than the predetermined distance, and discharge of water may be prevented from being started.

Accordingly, erroneous discharge of water by an unintentional water discharge operation on the first operation unit may be reliably prevented.

In the present invention, preferably, the control unit is capable of detecting position information of the first operation unit, and of causing water to be discharged at a water discharge flow rate according to the position information.

According to the present invention described above, position information of the first operation unit may be detected by the control unit, and water may be caused by the control unit to be discharged at a water discharge flow rate according to the position information of the first operation unit.

By causing water to be discharged at a flow rate according to the position information of the first operation unit, whether or not the first operation unit is set in the high flow rate region, in which the water discharge flow rate of the water discharge port is at or higher than a predetermined flow rate, may be easily and accurately determined, for example.

When discharge of water is started by a water discharge operation on the first operation unit, the flow rate of water discharged from the water discharge port may be gradually increased from the start of discharge of water by gradually moving the first operation unit while checking the position information of the first operation unit, and thus, the usability is high.

In the present invention, preferably, the first operation unit includes an accelerometer for detecting an orientation or a rotational motion of the first operation unit.

According to the present invention described above, the first operation unit includes the accelerometer for detecting an orientation or a rotational motion of the first operation unit, and thus, the position information of the first operation unit may be accurately acquired by the accelerometer, and also, the position information of the first operation unit may be acquired by a simple configuration.

In the present invention, preferably, in a case where a water stop operation is performed on the second operation unit after discharge of water from the water discharge port is started by a water discharge operation on the first operation unit, the control unit causes the opening and closing valve to be closed.

According to the present invention described above, in the case where a water stop operation is performed on the second operation unit after discharge of water from the water discharge port is started by a water discharge operation on the first operation unit, the opening and closing valve may be reliably closed.

Accordingly, a situation may be prevented where, after discharge of water from the water discharge port is started, a user intending to stop water cannot stop water in spite of performing a water stop operation on the second operation unit, and the user may be prevented from feeling a sense of discomfort.

Furthermore, regardless of which operation is performed to start discharge of water from the water discharge port, a user intending to stop water may certainly stop water by performing a water stop operation on the second operation unit, and thus, the usability is increased, and also, water is not wasted and water-saving can be achieved.

With the electronic faucet device according to the present invention, the operability and usability may be increased, and a user may be prevented from becoming confused at the time of operation.

DETAILED DESCRIPTION OF THE PREFERRED EMBODIMENTS

Hereinafter, an electronic faucet device according to a first embodiment of the present invention will be described with reference to FIGS. 1 to 4.

Figure 1:
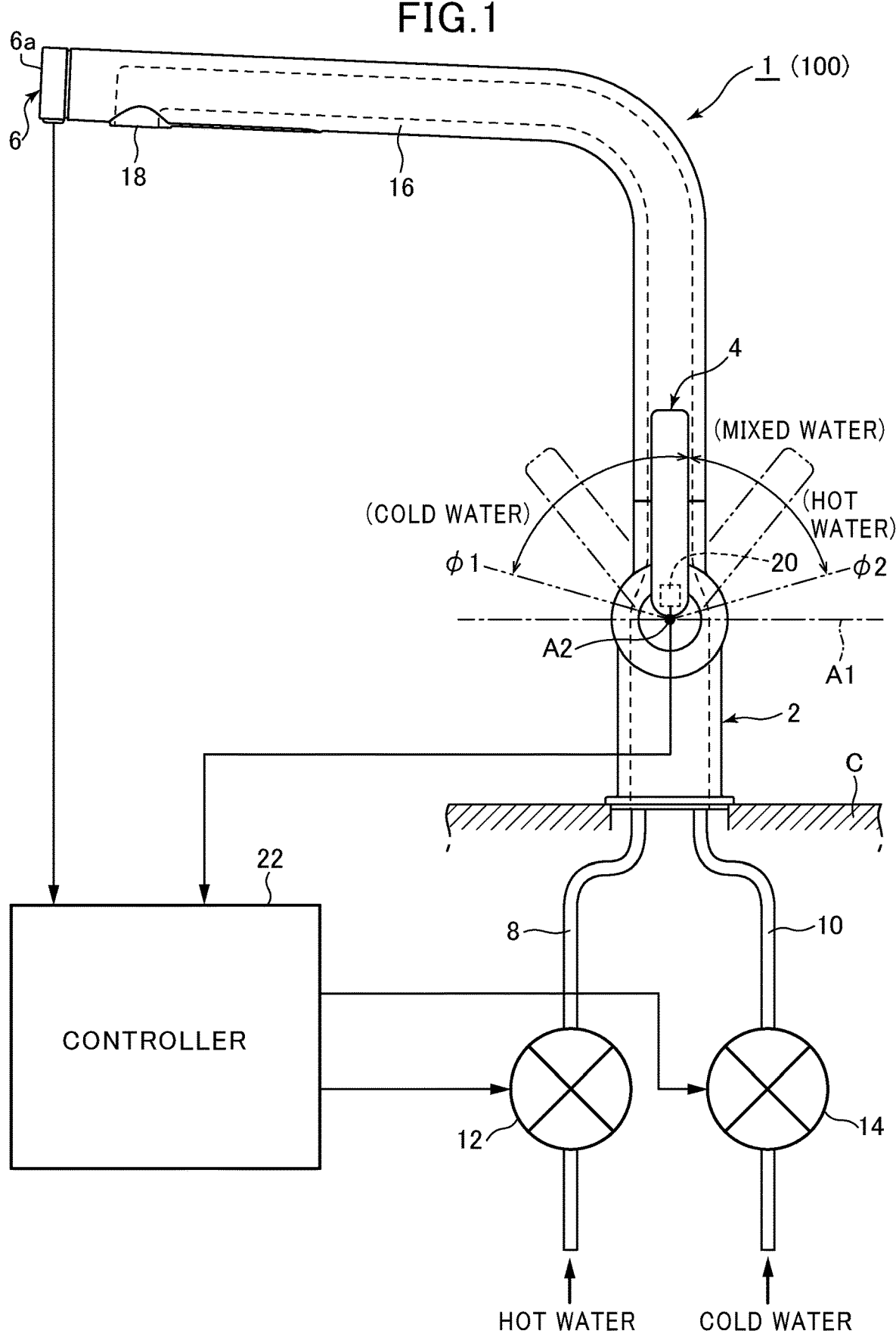
FIG. 1 is a block diagram showing a configuration of an electronic faucet device according to a first embodiment of the present invention.
Figure 2:
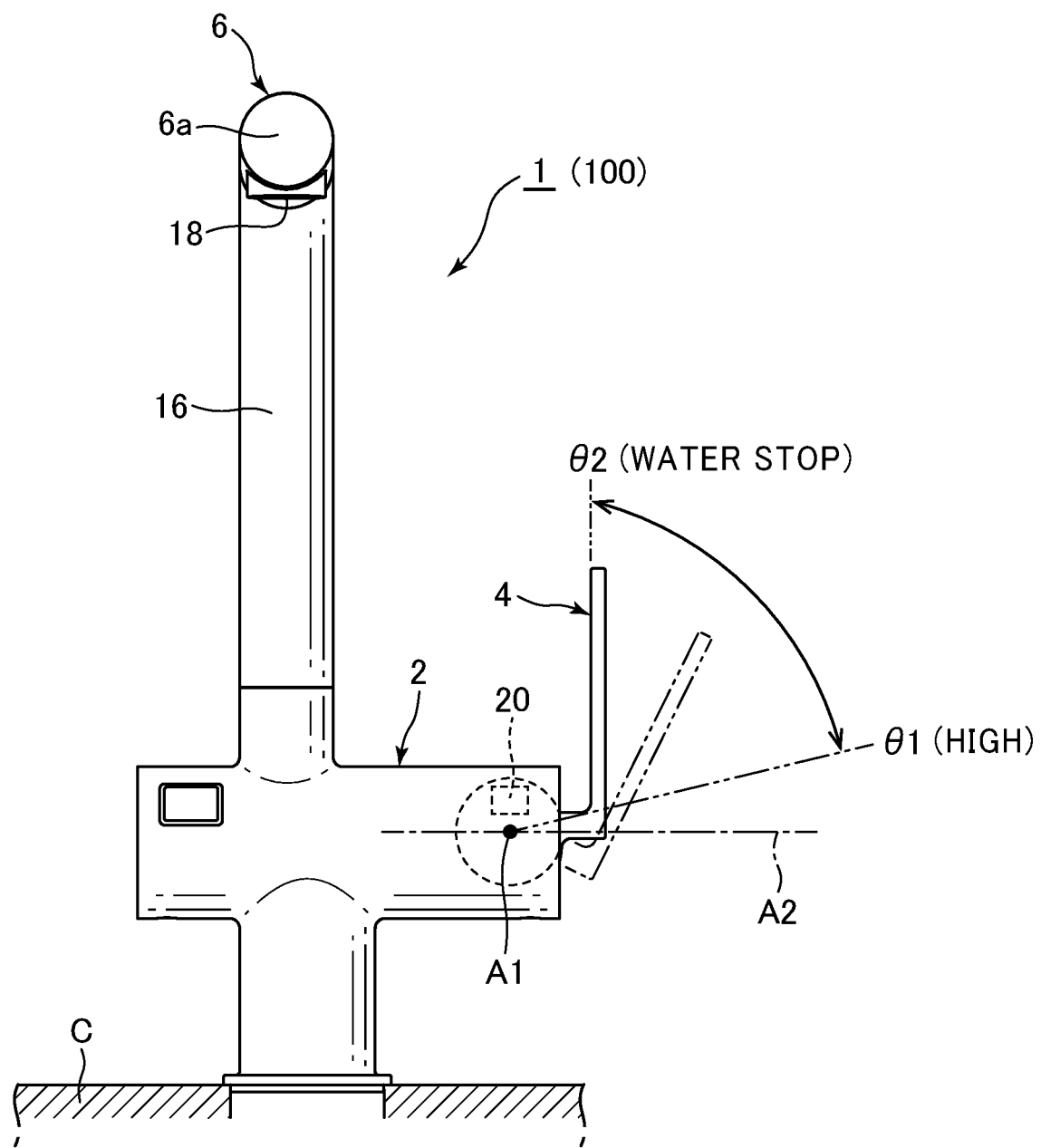
FIG. 2 is a schematic front view of the electronic faucet device according to the first embodiment of the present invention.

FIG. 1 is a block diagram showing a configuration of the electronic faucet device according to the first embodiment of the present invention. FIG. 2 is a schematic front view of the electronic faucet device according to the first embodiment of the present invention.

As shown in FIGS. 1 and 2, the electronic faucet device 1 according to the first embodiment of the present invention includes a faucet main body 2, a single-lever operation lever 4, which is a first operation unit, and a touch detection device 6, which is a second operation unit.

First, as shown in FIGS. 1 and 2, the faucet main body 2 is attached on a counter board C, and a hot water (heated water) passage 8 and a cold water (non-heated water) passage 10 are connected on an upstream side of the faucet main body 2.

As shown in FIG. 1, with the electronic faucet device 1 of the present embodiment, a motor valve 12 for hot water (heated water) and a motor valve 14 for cold water (non-heated water), which are electric opening and closing valves, are provided to the hot water passage 8 and the cold water passage 10, respectively.

As shown in FIGS. 1 and 2, a spout 16 is provided on a downstream side of the faucet main body 2. A water discharge port 18, which is a water discharge port for discharging water mixed at the faucet main body 2, is provided near a distal end portion of the spout 16.

In the present embodiment, a description is given of a mode where the motor valve 12 for hot water (heated water) and the motor valve 14 for cold water (non-heated water) are provided at the hot water passage 8 and the cold water passage 10, respectively, but such a mode is not restrictive, and other modes may also be adopted. For example, as another mode, there may be a mode in which, after a temperature of water is adjusted not by the motor valves 12, 14 but by a mixing valve (opening and closing valve for temperature adjustment) provided at a mixing portion where hot water (heated water) from the hot water passage 8 and cold water (non-heated water) from the cold water passage 10 are mixed, the flow rate of water is adjusted by a flow rate adjustment valve (opening and closing valve for flow rate adjustment) provided at a mixing passage on a downstream side of the mixing valve.

Next, as shown in FIGS. 1 and 2, the single-lever operation lever 4 is rotatably provided at a side of the faucet main body 2.

That is, as shown in FIGS. 1 and 2, the operation lever 4 enables a water discharge and stop operation by being operated to rotate around a rotation center axis A1, which extends in a horizontal front-back direction when seen from the side of the operation lever 4, and also allows a flow rate adjustment operation for a water discharge flow rate of water that is discharged from the water discharge port 18.

For example, as shown in FIG. 2, in a case where the operation lever 4 is rotated in one direction θ1 (water discharge-side operation direction θ1) around the rotation center axis A1, a water discharge operation is performed to increase the water discharge flow rate, and in a case where the operation lever 4 is rotated in the other direction θ2 (water stop-side direction θ2) around the rotation center axis A1, a water discharge operation is performed to reduce the water discharge flow rate, and an operation is performed to stop water when an orientation of the operation lever 4 is such that the operation lever 4 extends in an approximately vertical direction.

As shown in FIGS. 1 and 2, the operation lever 4 enables an adjustment operation regarding a water discharge temperature of water that is discharged from the water discharge port 18, by being rotated around a rotation center axis A2, which is perpendicular to the rotation center axis A1 and which extends in a horizontal left-right direction when seen from a front.

For example, as shown in FIG. 1, in a case where the operation lever 4 is rotated in one direction φ1 (low temperature-side operation direction φ1) around the rotation center axis A2, the water discharge temperature is operated to a low temperature side, and in a case where the operation lever 4 is rotated in the other direction φ2 (high temperature-side operation direction φ2) around the rotation center axis A2, the water discharge temperature is operated to a high temperature side.

As shown in FIGS. 1 and 2, an accelerometer 20 is provided at a proximal end portion of the operation lever 4. The accelerometer 20 rotates together with the operation lever 4 according to the rotation operation of the operation lever 4 to detect an orientation, such as an inclination state, or a rotational motion of the operation lever 4.

As shown in FIG. 1, the electronic faucet device 1 includes a controller 22, which is a control unit for controlling opening and closing of each motor valve 12, 14. The controller 22 includes a detection circuit (not shown) where a microcomputer (not shown), programs (not shown) and the like are embedded. Accordingly, when a signal according to operation of the operation lever 4 or the touch detection device 6 is transmitted to the detection circuit (not shown), a signal processed at the detection circuit (not shown) is output to each motor valve 12, 14, and the valve 12, 14 is electrically opened and closed.

That is, as shown in FIG. 1, when the operation lever 4 is rotated, opening and closing of each motor valve 12, 14 can be controlled based on an acceleration signal output from the accelerometer 20 detecting the orientation or the rotational motion of the operation lever 4, and a water discharge and stop operation of switching the water discharge port 18 between a water discharge state and a water stop state may be performed according to operation of the operation lever 4.

Additionally, in the present embodiment, a so-called MEMS accelerometer, which is known as an accelerometer to which microelectromechanical systems (MEMS) technology is applied, is used as the accelerometer 20, and the structure of the accelerometer 20 itself, and basic detection method and principles are the same as those of a conventional accelerometer, and a description thereof is omitted.

As shown in FIGS. 1 and 2, the touch detection device 6 includes a detection unit 6a provided at a distal end of the faucet main body 2. A surface of the detection unit 6a is a contact portion which a user can touch, and when a user lightly touches the contact portion, such as the surface of the detection unit 6a, a signal of the touch is transmitted to the controller 22, and each motor valve 12, 14 is electrically opened and closed, for example.

Accordingly, the water discharge and stop operation of switching the water discharge port 18 between the water discharge state and the water stop state can be performed under control of the controller 22 according to the touch operation on the touch detection device 6.

Next, a main flow related to the water discharge and stop operation of the electronic faucet device according to the first embodiment of the present invention will be described with reference to FIGS. 1 to 4.

Figure 3:
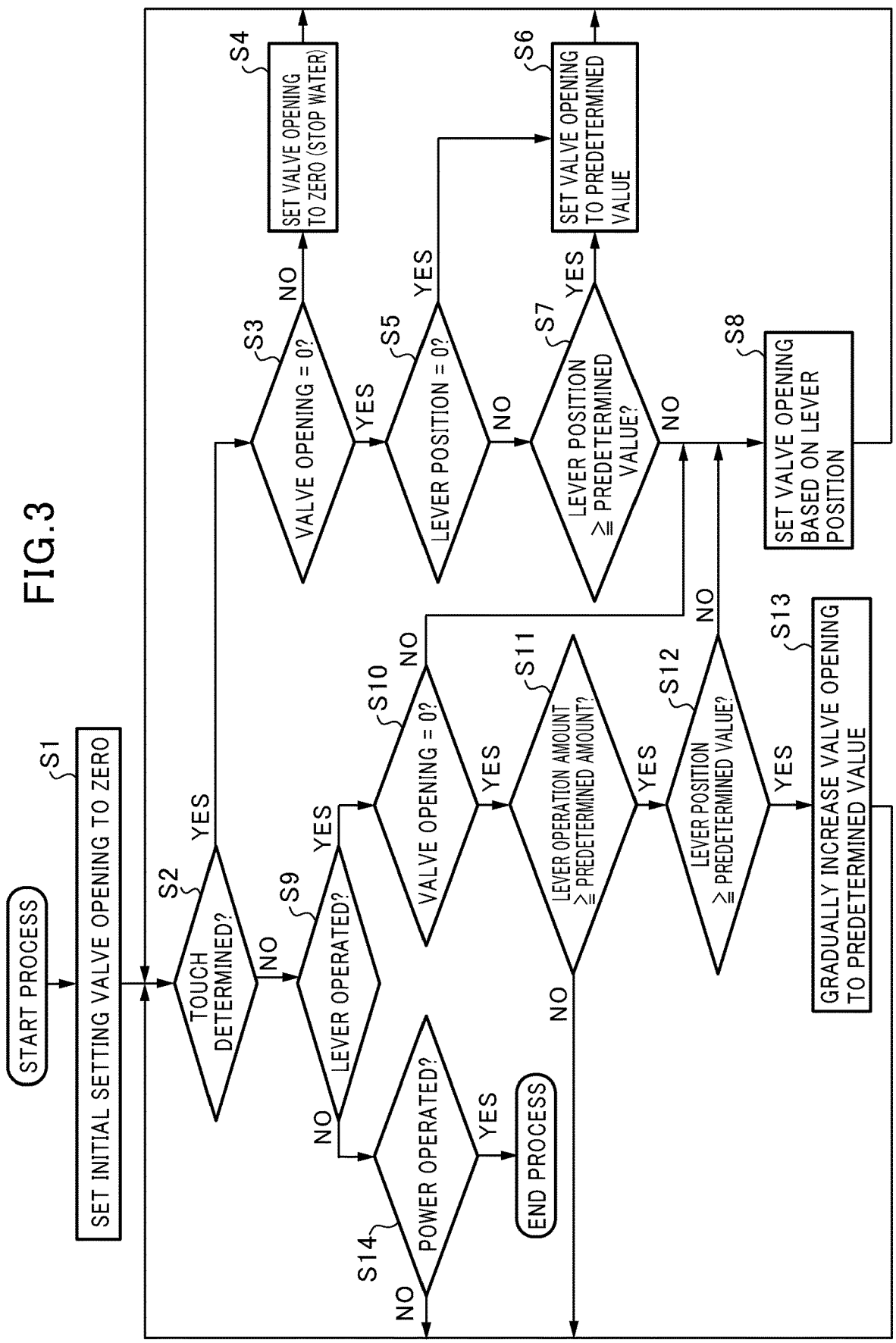
FIG. 3 shows a main flow related to a water discharge and stop operation of the electronic faucet device according to the first embodiment of the present invention.

FIG. 3 shows a main flow related to the water discharge and stop operation of the electronic faucet device according to the first embodiment of the present invention.

Processes in the flowchart shown in FIG. 3 are executed by the microcomputer (not shown) and programs embedded in the detection circuit (not shown) of the controller 22.

In the flowchart shown in FIG. 3, a position of the operation lever 4 is expressed as a numerical value, and for example, zero is set as a water stop position of the operation lever 4, and a value greater than zero is set to a water discharge position, and a numerical value of the water discharge position is set greater as a water discharge flow rate region is set to a higher flow rate.

First, in initial setting in step S1 shown in FIG. 3, an opening of each valve 12, 14 is set to zero.

Next, in touch determination in step S2, whether or not a touch operation is performed on the surface (contact portion) of the detection unit 6a of the touch detection device 6 is determined. Then, in the case where it is determined that a touch operation is performed, based on an electrical signal or the like transmitted from the detection unit 6a of the touch detection device 6 to the controller 22, whether or not the opening of each valve 12, 14 is zero is determined in step S3.

Next, in the case where the opening of each valve 12, 14 is other than zero in step S3 shown in FIG. 3, or in other words, if water is being discharged, it is determined that the current touch operation is performed by a user with a water stop operation in mind, and the process proceeds to step S4.

Then, in step S4, the opening of each valve 12, 14 is set to zero, and discharge of water from the water discharge port 18 is stopped.

Next, in the case where the opening of each valve 12, 14 is zero in step S3 shown in FIG. 3, or in other words, if water is stopped, it is determined that the current touch operation is performed by the user with the water discharge operation in mind, and whether or not the position of the operation lever 4 detected by the accelerometer 20 is zero is determined in step S5.

Then, in the case where the position of the operation lever 4 detected by the accelerometer 20 is zero in step S5, or in other words, if the position of the operation lever 4 before the current touch operation is a water stop position, the process proceeds to step S6.

Then, in step S6, the opening of at least the motor valve 14 for cold water, among the valves 12, 14, is set at a predetermined value other than zero, and discharge of cold water or hot water from the water discharge port 18 is started at a predetermined flow rate and at a temperature set according to the operation position of the operation lever 4.

That is, in steps S5 and S6, in the case where the water discharge flow rate of the water discharge port 18 is set at zero by the water stop operation on the operation lever 4, the controller 22 determines, based on the water discharge operation by the touch operation on the touch detection device 6, that a signal indicating an operation for opening each valve 12, 14 is input, and starts discharge of water from the water discharge port 18 at the predetermined flow rate which is set in advance, and starts discharge of water at the temperature which is set based on the operation position of the operation lever 4.

The predetermined flow rate of water that is discharged from the water discharge port 18, in step S6, by the water discharge operation performed based on the current touch operation can be changed by touching the surface (contact portion) of the detection unit 6a of the touch detection device 6 for a predetermined period of time (such as a long-press of five seconds), based on a flow of a flow rate setting change mode shown in FIG. 4, which is described in detail later.

Next, in the case where the position of the operation lever 4 is at other than zero in step S5 shown in FIG. 3, or in other words, in the case where the position of the operation lever 4 before the current touch operation is at the water discharge position, whether or not the position of the operation lever 4 is at or greater than a predetermined value which is other than zero is determined in step S7.

In the case where the position of the operation lever 4 is at or greater than the predetermined value, which is other than zero, in step S7, or in other words, in the case where the water discharge flow rate is set in a high flow rate region, the process proceeds to step S6. Then, in step S6, discharge of cold water or hot water from the water discharge port 18 is started at the predetermined flow rate and at the temperature which is set according to the operation position of the operation lever 4. Accordingly, even if a user performs the water discharge operation without checking the position of the operation lever 4, water may be prevented from suddenly flowing at a high flow rate and from splashing out.

After step S6 shown in FIG. 3, the process returns to step S2, and touch determination is performed again. Then, in the case where it is determined in step S2 that a touch operation is not performed, the process proceeds to step S9.

Next, in the case where it is determined in step S9 that the operation lever 4 is operated, based on an electrical signal transmitted from the accelerometer 20 to the controller 22, for example, whether or not the opening of each valve 12, 14 is zero is determined in step S10.

That is, in the case where the operation lever 4 is operated after discharge of cold water or hot water from the water discharge port 18 at the predetermined flow rate and the predetermined temperature is started in step S6 based on a previous touch operation, a signal which is transmitted from the accelerometer 20 of the operation lever 4 to the controller 22 is prioritized, and the flow rate and temperature of discharged water are changed according to an amount of operation and an operation position of the operation lever 4.

In the case where the position of the operation lever 4 is zero in step S8 following step S10, it is determined that the water stop operation is performed on the operation lever 4, and the opening of each valve 12, 14 is set to zero and discharge of water from the water discharge port 18 is stopped.

On the other hand, in the case where the position of the operation lever 4 is determined in step S7 shown in FIG. 3 to be at less than the predetermined value, the process proceeds to step S8, and the opening of each valve 12, 14 is set according to the water discharge position and a temperature position of the operation lever 4, and the flow rate and temperature of cold water or hot water that is discharged from the water discharge port 18 are adjusted. At this time, if the water discharge position of the operation lever 4 is zero, the flow rate is changed to zero, and the water is stopped.

Next, in the case where it is determined in the touch determination in step S2 shown in FIG. 3 that a touch operation is not performed, whether or not the operation lever 4 is operated is determined in step S9.

Then, in the case where it is determined in step S9 that the operation lever 4 is operated, based on an electrical signal or the like transmitted from the accelerometer 20 to the controller 22, whether or not the opening of each valve 12, 14 is zero is determined in step S10.

In the case where the opening of each valve 12, 14 is other than zero in step S10, it is determined that the operation lever 4 is operated during discharge of water, and the process proceeds to step S8. The opening of each valve 12, 14 is then set according to the water discharge position and the temperature position of the operation lever 4, and the flow rate and temperature of cold water or hot water that is discharged from the water discharge port 18 are adjusted.

Next, in the case where the opening of each valve 12, 14 is zero in step S10 shown in FIG. 3, or in other words, in the case where water is stopped, the process proceeds to step S11, and whether or not a movement distance of the operation lever 4 (an amount of operation of the operation lever 4) is a predetermined amount or more is determined, where the predetermined amount is other than zero.

Then, in the case where the movement distance of the operation lever 4 (the amount of operation of the operation lever 4) is smaller than the predetermined amount in step S11, it is determined that the operation lever 4 is only slightly moved due to occurrence of vibration in the periphery, for example, and that the user is not intentionally performing the water discharge operation, and the process proceeds to step S2 and the touch determination is performed again.

On the other hand, in the case where the movement distance of the operation lever 4 (the amount of operation of the operation lever 4) is the predetermined amount or more in step S11 shown in FIG. 3, the process proceeds to step S12 so that water is discharged. That is, even in a state where each valve 12, 14 is closed by a signal from the touch detection device 6, if a signal indicating an operation for opening each valve 12, 14 is then input from the accelerometer 20 of the operation lever 4 to the controller 22, it is determined that a water discharge operation is performed on the operation lever 4, and discharge of water from the water discharge port 18 is started.

Then, in the case where it is determined in step S12 that the position of the operation lever 4 is at less than the predetermined value, the process proceeds to step S8, and the opening of each valve 12, 14 is set according to the water discharge position and the temperature position of the operation lever 4, and discharge of cold water or hot water from the water discharge port 18 is started.

In the case where the position of the operation lever 4 is determined in step S12 shown in FIG. 3 to be at or greater than the predetermined value, it is determined that the user performed, on the operation lever 4, the current lever operation from the previous water stop position with the water discharge operation at the water discharge position in the high flow rate region in mind, and the process proceeds to step S13.

Then, in step S13, the opening of each valve 12, 14 is gradually increased over a predetermined period of time, from zero to an opening at a predetermined value corresponding to a relatively high flow rate region. More specifically, the range in the one direction θ1 in FIG. 2 is a high flow rate region where water is discharged at a flow rate higher than a predetermined value, and the range of the other direction θ2 is a low flow rate region where water is discharged at a flow rate lower than the predetermined value, and in the case where the position of the operation lever 4 is determined to be in the high flow rate region, an amount of increase in the water discharge flow rate per unit time is reduced compared to a case where the position is in the low flow rate region.

Additionally, at the time of gradually increasing the opening of each valve 12, 14 over a predetermined period of time, the opening of each valve 12, 14 may be increased over time in a stepwise manner or in a continuous manner. After a target flow rate is reached, the process returns to step S2, and the series of processes are continued.

Next, in the case where it is determined in step S9 shown in FIG. 3 that the operation lever 4 is not operated, whether or not power operation, such as switching off of power (not shown) of the electronic faucet device 1, is performed is determined in step S14.

Then, in the case where it is determined in step S14 that power operation is performed, the process is ended, and in the case where it is determined that power operation is not performed, the process returns to step S2, and the series of processes are continued.

Next, a flow of a flow rate setting change mode related to the water discharge and stop operation of the electronic faucet device according to the first embodiment of the present invention will be described with reference to FIG. 4.

Figure 4:
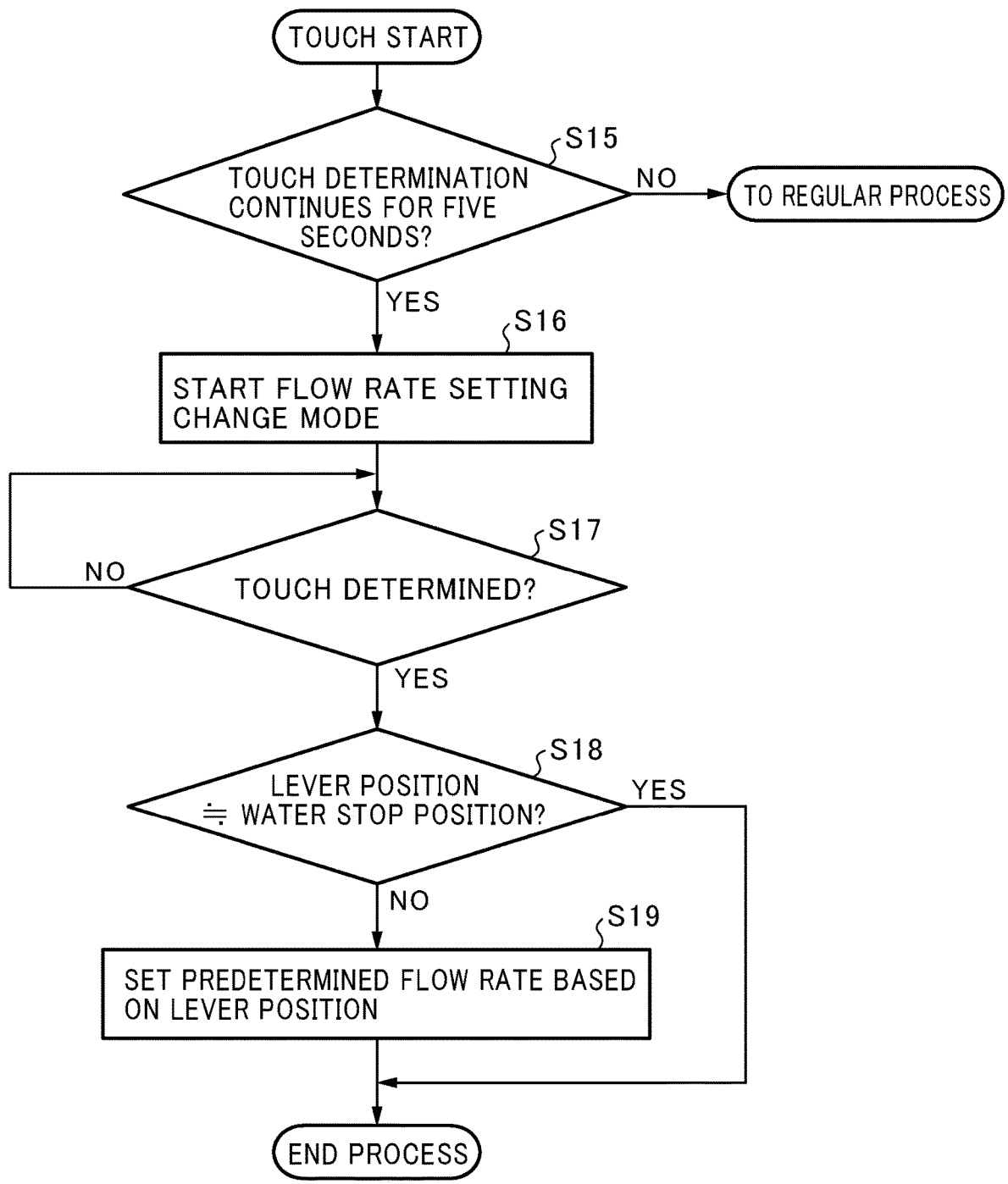
FIG. 4 is a flow of a flow rate setting change mode related to the water discharge and stop operation of the electronic faucet device according to the first embodiment of the present invention.

FIG. 4 is a flow of the flow rate setting change mode related to the water discharge and stop operation of the electronic faucet device according to the first embodiment of the present invention.

In the present embodiment, the controller 22 includes, as a flow rate setting change device, a mode (flow rate setting change mode) in which setting regarding a predetermined flow rate which is determined in advance with respect to water that is discharged from the water discharge port 18 by a water discharge operation by a touch operation can be changed.

First, in the case where a predetermined flow rate of water to be discharged from the water discharge port 18 by a water discharge operation by a current touch operation is desired to be changed in step S6 shown in FIG. 3, the controller 22 executes the flow rate setting change mode according to the flow shown in FIG. 4.

First, it is determined whether or not a state where the surface (contact portion) of the detection unit 6a of the touch detection device 6 is touched is continued for five seconds is determined in touch determination in step S15 shown in FIG. 4.

In the case where it is determined in step S15 that the state where a touch is performed is not continued for five seconds, regular processing is performed by the main flow shown in FIG. 3.

On the other hand, in the case where it is determined in step S15 shown in FIG. 4 that the state where a touch is performed is continued for five seconds, or in other words, in the case where it is determined that a long-press is performed with the surface (contact portion) of the detection unit 6a of the touch detection device 6 being touched for five seconds, the flow rate setting change mode is started in step S16.

When the flow rate setting change mode is started in step S16, a user sets the position of the operation lever 4 by operating the position of the operation lever 4 such that a desired water discharge flow rate is reached, and the process proceeds to step S17.

Next, in step S17 shown in FIG. 4, whether or not a touch operation is performed again on the surface (contact portion) of the detection unit 6a of the touch detection device 6 is determined.

Then, in the case where it is determined in step S17 that the surface (contact portion) of the detection unit 6a of the touch detection device 6 is touched again, the process proceeds to step S18, and whether or not the position of the operation lever 4 is set approximately at the water stop position (operation position at and around the water stop position) is determined.

Then, in the case where it is determined in step S18 that the position of the operation lever 4 is set approximately at the water stop position, the process of the flow rate setting change mode is ended without the flow rate setting being changed.

On the other hand, in the case where it is determined in step S18 that the position of the operation lever 4 is not set approximately at the water stop position, the process proceeds to step S19, and setting of the predetermined flow rate is changed based on the position of the operation lever 4 set in the preceding step S16. A flow rate according to the use state or preference of the user is thereby set with respect to the water discharge flow rate of water that is discharged from the water discharge port 18 by the water discharge operation by the touch operation, and the series of processes of the flow rate setting change mode is ended.

Figure 5:
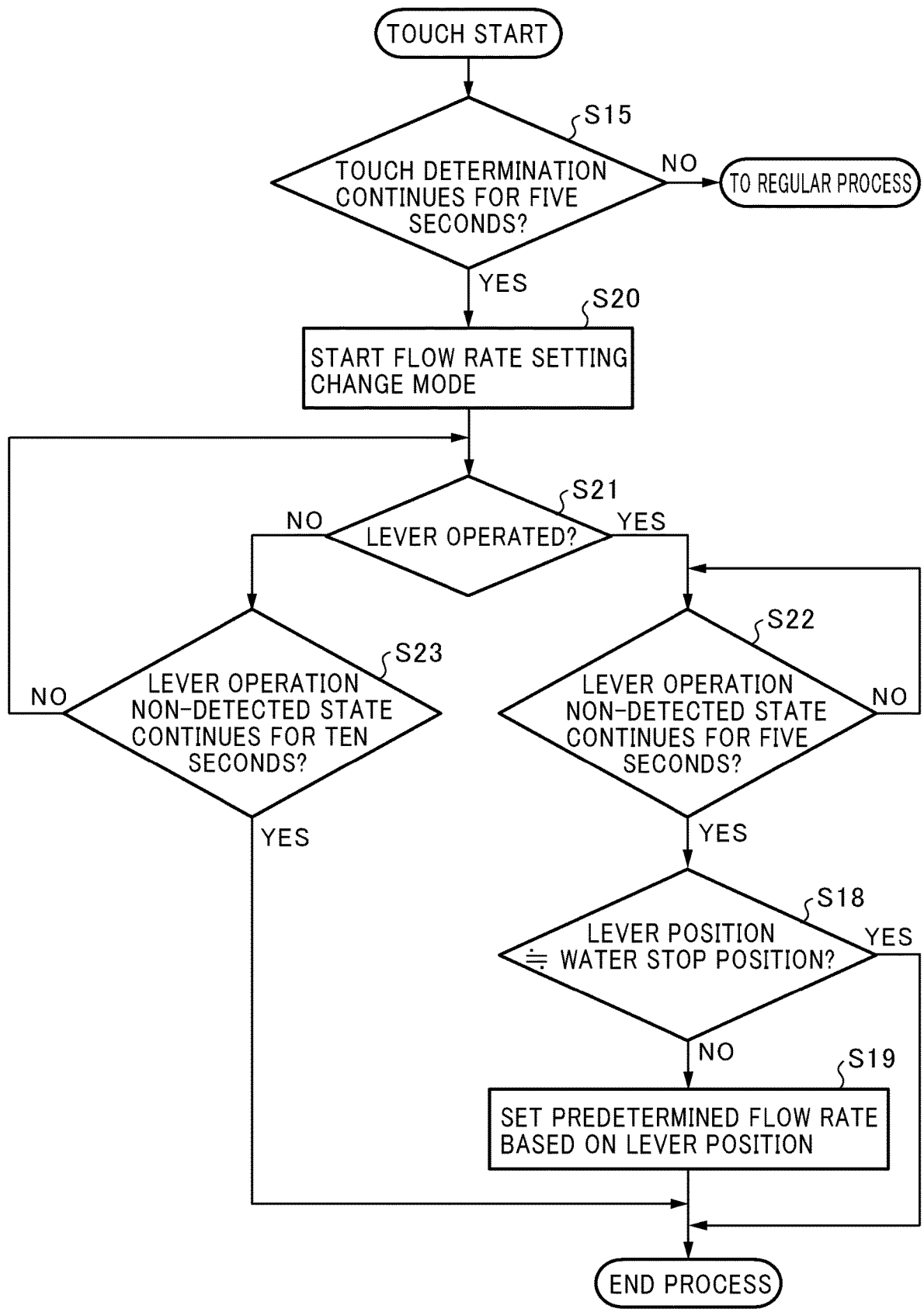
FIG. 5 is an example modification of the flow of the flow rate setting change mode related to the water discharge and stop operation of the electronic faucet device according to the first embodiment of the present invention.

Next, FIG. 5 is an example modification of the flow of the flow rate setting change mode related to the water discharge and stop operation of the electronic faucet device according to the first embodiment of the present invention.

As shown in FIG. 5, in the example modification of the flow of the flow rate setting change mode related to the water discharge and stop operation of the electronic faucet device 1 according to the first embodiment of the present invention, steps S20 to S23 are different from steps S16 and S17 shown in FIG. 4.

First, in the case where it is determined in step S15 shown in FIG. 5 that the state where a touch is performed is continued for five seconds, or in other words, in the case where it is determined that a long-press is performed with the surface (contact portion) of the detection unit 6a of the touch detection device 6 being touched for five seconds, the process proceeds to step S20 and the flow rate setting change mode is started, and then, the process proceeds to step S21.

Next, after the flow rate setting change mode is started in step S20, whether or not the operation lever 4 is operated by the user is determined in step S21 shown in FIG. 5.

Then, in the case where it is determined in step S21 that the operation lever 4 is operated by the user, the process proceeds to step S22, and whether or not a state where operation of the operation lever 4 is not detected (lever operation non-detected state) is continued for five seconds is determined.

Next, in the case where it is determined in step S22 shown in FIG. 5 that the state where operation of the operation lever 4 is not detected (lever operation non-detected state) is continued for five seconds, whether or not the position of the operation lever 4 is set approximately at the water stop position (operation position at and around the water stop position) is determined in step S18 the same as step S18 shown in FIG. 4.

Then, in the case where it is determined in step S18 shown in FIG. 5 that the position of the operation lever 4 is not set approximately at the water stop position, setting of the predetermined flow rate is changed in step S19 the same as step S19 shown in FIG. 4, based on the position of the operation lever 4 set by the operation of the operation lever 4 detected in step S21. A flow rate according to the use state or preference of the user is thereby set with respect to the water discharge flow rate of water that is discharged from the water discharge port 18 by a water discharge operation by a touch operation, and the series of processes of the flow rate setting change mode is ended.

On the other hand, in the case where it is determined in step S21 shown in FIG. 5 that the operation lever 4 is not operated by the user, the process proceeds to step S23.

In the case where it is determined in step S23 that the state where operation of the operation lever 4 is not detected (lever operation non-detected state) is continued for ten seconds, the process of the flow rate setting change mode is ended. That is, in the case where the lever operation is not performed even once after the flow rate setting change mode is started, the flow rate setting change mode is ended with no change to the flow rate setting.

Next, advantageous effects of the electronic faucet device 1 according to the first embodiment of the present invention described above will be described with reference to FIGS. 1 to 5.

First, with the electronic faucet device 1 according to the first embodiment of the present invention described above, in the case where a water discharge and stop operation is performed on one operation unit among the operation lever 4 and the touch detection device 6 in a state where the water discharge and stop operation is performed on the other operation unit, the controller 22 may control each valve 12, 14 by prioritizing an electrical signal transmitted from the one operation unit, to reliably enable discharge and stopping of water at the water discharge port 18.

Accordingly, for example, in the case where discharge of water from the water discharge port 18 is desired to be started, discharge of water can be reliably started even in a state where a water stop operation is performed on one operation unit among the operation lever 4 and the touch detection device 6, by performing a water discharge operation on the other operation unit.

Accordingly, a user having a water discharge operation in mind may certainly cause water to be discharged by operating either of the operation lever 4 and the touch detection device 6. The user may thus be prevented from becoming confused due to intended discharge of water not being performed in spite of a water discharge operation performed by the user.

The electronic faucet device 1 with increased operability, which is easy to use and which does not cause confusion to a user at the time of operation may thereby be provided.

With the electronic faucet device 1 according to the present embodiment, the flow rate of water that is discharged from the water discharge port 18 can be adjusted by operation of the operation lever 4. Even in a case where the water discharge flow rate is set to zero by a water stop operation on the operation lever 4, discharge of water from the water discharge port 18 may be reliably started at a predetermined flow rate which is set in advance, when the controller 22 determines that a signal indicating an operation for opening each valve 12, 14 is input by a water discharge operation by a touch operation on the touch detection device 6.

Accordingly, even in a case where the water discharge flow rate is set to zero by a water stop operation on the operation lever 4, a user having discharge of water in mind may certainly cause water to be discharged, by performing a touch operation (water discharge operation) on the touch detection unit 6a (contact portion) of the touch detection device 6. The user may thus be prevented from becoming confused due to intended discharge of water not being performed in spite of a water discharge operation performed by the user.

With the electronic faucet device 1 according to the present embodiment, the temperature of water that is discharged from the water discharge port 18 can be adjusted by operation of the operation lever 4. Even in a case where the water discharge flow rate is set to zero by a water stop operation on the operation lever 4, discharge of water from the water discharge port 18 may be started at a temperature that is set based on the operation position of the operation lever 4, when the controller 22 determines that a signal indicating an operation for opening each valve 12, 14 is input by a touch operation (water discharge operation) on the touch detection device 6.

At this time, the water discharge temperature at the water discharge port 18 can be predicted to a certain degree by looking at the operation position (water discharge temperature position) of the operation lever 4. Because discharge of water from the water discharge port 18 may be started at a temperature set by the operation lever 4, a difference between the predicted water discharge temperature and the actual water discharge temperature may be suppressed, and a user may be prevented from feeling a sense of discomfort.

With the electronic faucet device 1 according to the present embodiment, when the water discharge flow rate at the water discharge port 18 is zero due to a water stop operation on the operation lever 4, discharge of water from the water discharge port 18 may be reliably started at a predetermined flow rate which is set in advance, by a touch operation (water discharge operation) on the touch detection device 6.

At this time, there are various demands with respect to the water discharge flow rate depending on the use state and the preference of the user, but because a predetermined flow rate set in advance for discharge of water from the water discharge port 18 may be changed by the flow rate setting change device (the flow rate setting change mode shown in FIG. 4 or 5) of the controller 22, a water discharge flow rate according to the use state or the preference of the user may be set.

The usability can thereby be increased.

With the electronic faucet device 1 according to the present embodiment, when the operation lever 4 is operated after a touch operation is performed on the touch detection device 6, the signal transmitted from the accelerometer 20 of the operation lever 4 is prioritized, and the flow rate or temperature of discharged water may be reliably changed.

Accordingly, in the case where a water discharge operation is performed on the operation lever 4 after discharge of water at a predetermined flow rate which is set in advance is started by a touch operation (water discharge operation) on the touch detection device 6, a situation where the flow rate or temperature of discharged water is not changed even though a water discharge operation is performed on the operation lever 4 may be prevented, and a user may be prevented from feeling a sense of discomfort.

Water may thus be discharged at a flow rate or temperature intended by the user, and the usability may be increased.

With the electronic faucet device 1 according to the present embodiment, in a case where a water stop operation is performed on one of the operation lever 4 and the touch detection device 6 in a state where water is being discharged from the water discharge port 18, each valve 12, 14 may be reliably closed.

Accordingly, a situation may be prevented where a user intending to stop water cannot stop water even though the user is performing a water stop operation on one operation unit among the operation lever 4 and the touch detection device 6, and the user may be prevented from feeling a sense of discomfort.

Furthermore, in the case where water is intended to be stopped, water may be reliably stopped by performing a water stop operation on either of the operation lever 4 and the touch detection device 6, and thus, the usability is increased, and also, water is not wasted and water-saving can be achieved.

With the electronic faucet device 1 according to the first embodiment of the present invention described above, even in a state where a signal indicating an operation for closing each valve 12, 14 is input from the touch detection device 6 to the controller 22, if a signal indicating an operation for opening each valve 12, 14 is then input from the accelerometer 20 of the operation lever 4 to the controller 22, it is determined that a water discharge operation is performed on the operation lever 4, and discharge of water from the water discharge port 18 may be reliably started.

A user with a water discharge operation in mind may thus be prevented from becoming confused due to discharge of water not being started in spite of the user performing a water discharge operation on the operation lever 4 in a state where a water stop operation is performed on the touch detection device 6.

Accordingly, a user who is not used to the electronic faucet device 1 including two operation units, the operation lever 4 and the touch detection device 6, may certainly cause water to be discharged as intended and without becoming confused, by performing a water discharge operation on the operation lever 4, and the usability is high.

The electronic faucet device 1 with increased operability, which is easy to use and which does not cause confusion to a user at the time of operation may thereby be provided.

With the electronic faucet device 1 according to the present embodiment, in the case where the movement distance (amount of operation) of the operation lever 4 is determined by the controller 22 to be at or greater than a predetermined value, it is determined that a water discharge operation is intended by the user, and discharge of water from the water discharge port 18 may be reliably started.

In the case where the movement distance (amount of operation) of the operation lever 4 is smaller than the predetermined value, it is determined that the operation lever 4 is only slightly moved due to occurrence of vibration in the periphery, for example, and that a user is not intentionally performing a water discharge operation, and discharge of water may be prevented from being started.

Accordingly, water may be reliably prevented from being erroneously discharged by an unintentional water discharge operation on the operation lever 4.

With the electronic faucet device 1 according to the present embodiment, in the case where the operation lever 4 is set in a high flow rate region in which the water discharge flow rate of the water discharge port 18 is at or higher than a predetermined flow rate, the controller 22 may perform control such that an increase in the water discharge flow rate of the water discharge port 18 per unit time, from the start of discharge of water, may be set smaller than in a case where setting is in a low flow rate region.

Accordingly, at the time of start of discharge of water, water may be prevented from being discharged at a high flow rate due to the operation lever 4 being set in the high flow rate region. A user may thereby be prevented from being surprised due to sudden start of discharge of water at an unexpectedly high flow rate, and also, reduction in the usability due to splashing of water may be prevented.

With the electronic faucet device 1 according to the present embodiment, position information of the operation lever 4 may be detected, and water may be discharged at a water discharge flow rate according to the position information of the operation lever 4, by the accelerometer 20 and the controller 22.

By causing water to be discharged at a flow rate according to the position information of the operation lever 4, whether or not the operation lever 4 is set in the high flow rate region, in which the water discharge flow rate of the water discharge port 18 is at or higher than a predetermined flow rate, may be easily and accurately determined, for example.

When discharge of water is started by a water discharge operation on the operation lever 4, the flow rate of water discharged from the water discharge port 18 may be gradually increased from the start of discharge of water by gradually moving the operation lever 4 while checking the position information of the operation lever 4, and thus, the usability is high.

With the electronic faucet device 1 according to the present embodiment, the operation lever 4 includes the accelerometer 20 for detecting an orientation and a rotational motion of the operation lever 4, and thus, the position information of the operation lever 4 may be accurately acquired by the accelerometer 20, and also, the position information of the operation lever 4 may be acquired by a simple configuration.

With the electronic faucet device 1 according to the present embodiment, in the case where a water stop operation is performed by a touch operation on the touch detection device 6 after discharge of water from the water discharge port 18 is started by a water discharge operation on the operation lever 4, each valve 12, 14 may be reliably closed.

Accordingly, a situation may be prevented where, after discharge of water from the water discharge port 18 is started, a user intending to stop water cannot stop water in spite of performing a water stop operation by a touch operation on the touch detection device 6, and the user may be prevented from feeling a sense of discomfort.

Furthermore, regardless of which operation is performed to start discharge of water from the water discharge port 18, a user intending to stop water may certainly stop water by performing a water stop operation by a touch operation on the touch detection device 6, and thus, the usability is increased, and also, water is not wasted and water-saving can be achieved.

Next, an electronic faucet device according to a second embodiment of the present invention will be described with reference to FIG. 6.

Figure 6:
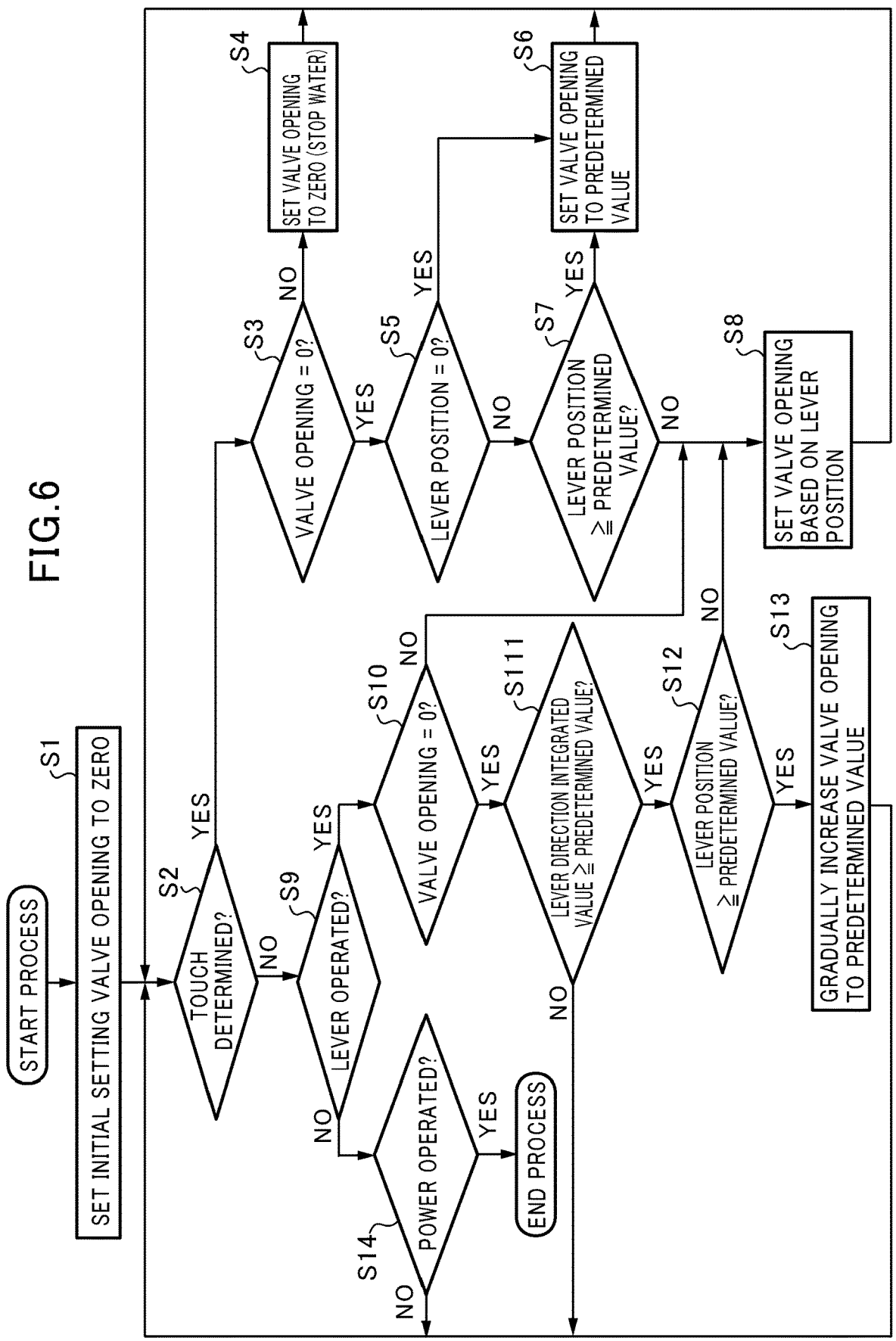
FIG. 6 shows a main flow related to a water discharge and stop operation of an electronic faucet device according to a second embodiment of the present invention.

FIG. 6 shows a main flow related to a water discharge and stop operation of the electronic faucet device according to the second embodiment of the present invention.

A configuration of an electronic faucet device 100 according to the second embodiment of the present invention is the same as the configuration of the electronic faucet device 1 according to the first embodiment of the present invention shown in FIGS. 1 and 2.

In a main flow related to the water discharge and stop operation of the electronic faucet device according to the second embodiment of the present invention shown in FIG. 6, only step S111 is different from step S11 in the main flow for the electronic faucet device according to the first embodiment of the present invention shown in FIG. 3, and other steps are the same as the steps in the main flow for the electronic faucet device according to the first embodiment described above.

Accordingly, the steps in the main flow related to the water discharge and stop operation of the electronic faucet device according to the second embodiment of the present invention shown in FIG. 6 the same as the steps in the main flow for the electronic faucet device 1 according to the above-described first embodiment of the present invention shown in FIG. 3 will be denoted by the same reference signs, and a description thereof will be omitted.

For example, first, in step S111 shown in FIG. 6, when the operation lever 4 is rotated in one direction (the water discharge-side operation direction θ1 or the water stop-side operation direction θ2) around the rotation center axis A1, and an integrated value for the operation lever 4 in the operation direction θ1 or θ2 is smaller than a predetermined amount, the process proceeds to step S2.

For example, in step S111 shown in FIG. 6, when the operation lever 4 is rotated in one direction (the water discharge-side operation direction θ1 or the water stop-side operation direction θ2) around the rotation center axis A1, and the integrated value for the operation lever 4 in the operation direction θ1 or θ2 is at or greater than the predetermined amount, the process proceeds to step S12.

Then, in the case where it is determined in step S12 that the position of the operation lever 4 is at less than the predetermined value, the process proceeds to step S8.

Then, in step S8 following step S12, it is determined that the degree of opening of each valve 12, 14 is at other than zero and smaller than the predetermined value and that each valve 12, 14 is at a water discharge position, but that the operation lever 4 is only slightly moved due to occurrence of vibration or the like and that the user is not intentionally performing the water discharge operation, and discharge of water is not performed.

In the case where it is determined in step S12 that the position of the operation lever 4 is at or greater than the predetermined value, the process proceeds to step S13, and the opening of each valve 12, 14 is gradually increased over a predetermined period of time from zero to an opening at a predetermined value corresponding to a relatively high flow rate region.

With the electronic faucet device 100 according to the second embodiment of the present invention described above, when vibration occurring in the periphery or the like is transmitted to the operation lever 4, the operation lever 4 is possibly moved by the vibration in the one direction θ1, φ1 or in the other direction θ2, φ$_2$.

At this time, if it is determined by the controller 22 that the operation lever 4 is moved only in one direction θ1 or θ2, and the integrated value for the operation lever 4 in the operation direction θ1 or θ2 is at or greater than the predetermined amount, the operation lever 4 is moved by a predetermined distance or more, and thus, discharge of water from the water discharge port 18 may be started by movement of the operation lever 4 by a water discharge operation intended by the user.

Accordingly, even when the operation lever 4 is moved in one direction θ1 or θ2, if the operation lever 4 is not moved by the predetermined distance or more, it can be determined that the operation lever 4 is only slightly moved, unintentionally by vibration or the like, by less than the predetermined distance, and discharge of water may be prevented from being started.

Accordingly, erroneous discharge of water by an unintentional water discharge operation on the operation lever 4 may be reliably prevented.

Next, an electronic faucet device according to a third embodiment of the present invention will be described with reference to FIGS. 7 and 8.

Figure 7:
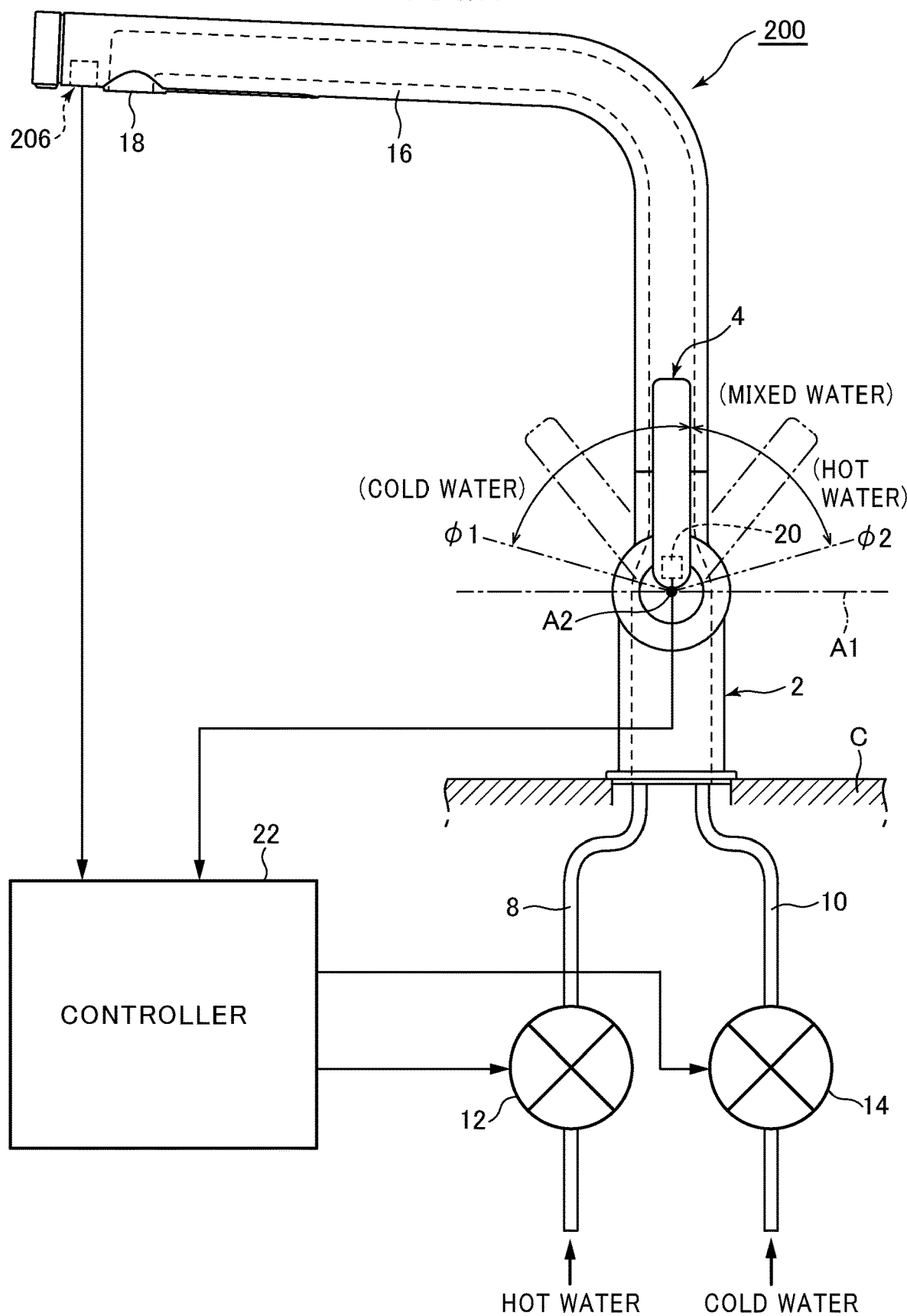
FIG. 7 is a block diagram showing a configuration of an electronic faucet device according to a third embodiment of the present invention.

FIG. 7 is a block diagram showing a configuration of the electronic faucet device according to the third embodiment of the present invention. FIG. 8 shows a main flow related to a water discharge and stop operation of the electronic faucet device according to the third embodiment of the present invention.

Figure 8:
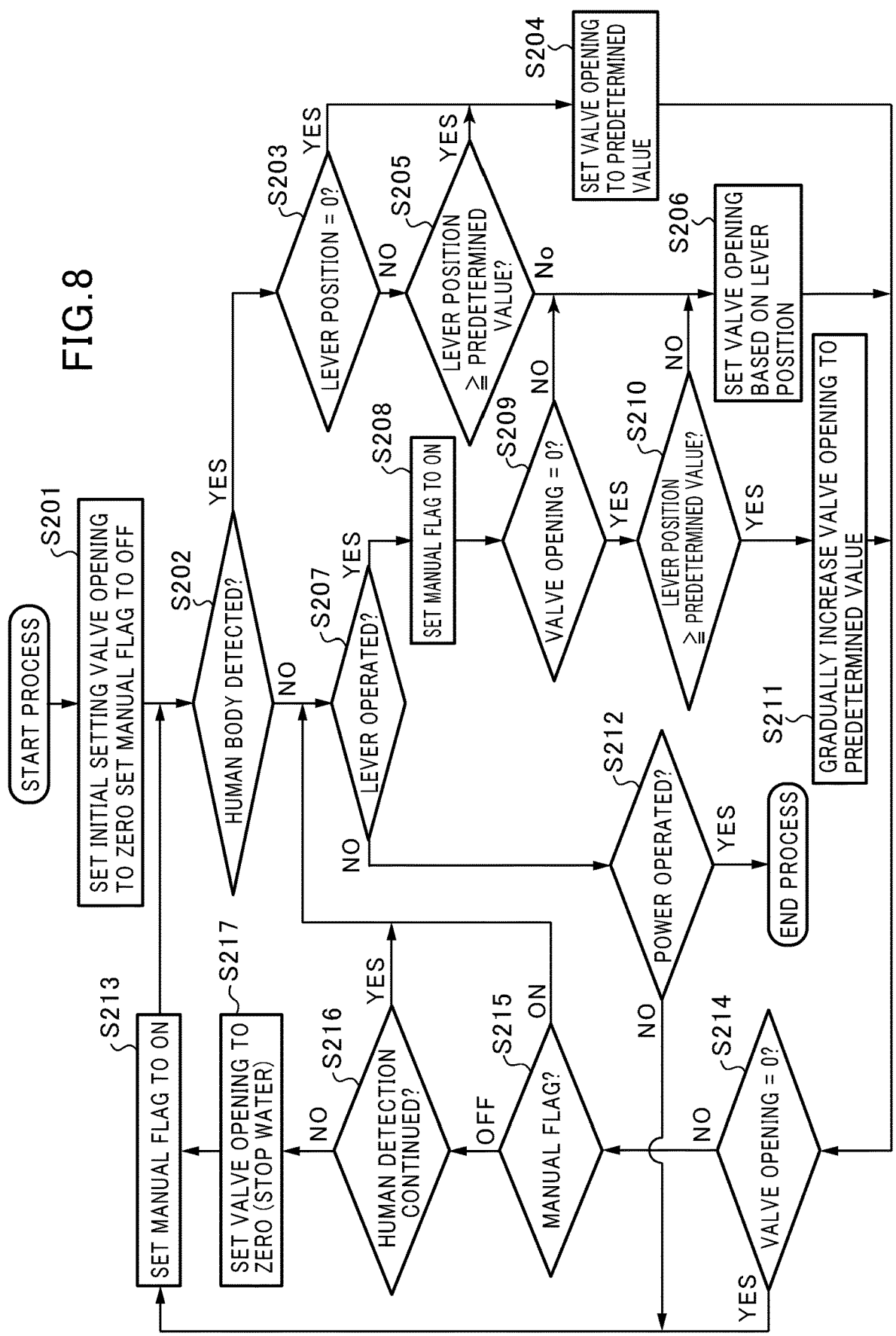
FIG. 8 shows a main flow related to a water discharge and stop operation of the electronic faucet device according to the third embodiment of the present invention.

Parts of an electronic faucet device 200 according to the third embodiment of the present invention shown in FIGS. 7 and 8 the same as parts of the electronic faucet device 1 according to the first embodiment of the present invention described above will be denoted by the same reference signs, and a description thereof will be omitted.

First, as shown in FIG. 7, with respect to the configuration of the electronic faucet device 200 according to the third embodiment of the present invention, that a human detection sensor 206 as the second operation unit is provided near the water discharge port 18 of the faucet main body 2 is different from the configuration of the touch detection device 6 as the second operation unit of the electronic faucet device 1 according to the first embodiment of the present invention shown in FIGS. 1 and 2, and other parts are the same.

With the electronic faucet device 200 according to the present embodiment, the human detection sensor 206 enables detection of presence and absence of a detection object, such as a hand or a finger, approaching below the water discharge port 18 of the spout 16, and automatic discharge of water may be performed based on a detection signal.

In the present embodiment, a description is given of an example where an infrared sensor is adopted as the human detection sensor 206, but other types of non-contact sensors, such as a microwave sensor, may also be adopted as an alternative to the infrared sensor.

Next, a main flow related to a water discharge and stop operation of the electronic faucet device 200 according to the present embodiment will be described with reference to FIG. 8.

First, in initial setting in step S201 shown in FIG. 8, an opening of each valve 12, 14 is set to zero, and a flag indicating a manual operation state of the operation lever 4 (hereinafter "manual flag") is set to off, and then, the process proceeds to step S202.

Next, in the case where it is determined in step S202 shown in FIG. 8 that an object is detected by the human detection sensor 206, the process proceeds to step S203, and whether or not the position of the operation lever 4 detected by the accelerometer 20 is zero is determined.

Then, in step S203, in the case where the position of the operation lever 4 detected by the accelerometer 20 is at zero, or in other words, in the case where the position of the operation lever 4 before current human detection is a water stop position, the current human detection is determined to have been performed by a user with a water discharge operation in mind causing the human detection sensor 206 to detect an object, such as a hand or a finger, and the process proceeds to step S204.

Then, in step S204, the opening of at least the motor valve 14 for cold water, among the valves 12, 14, is set to a predetermined value which is other than zero and which is set in advance, and discharge of cold water or hot water from the water discharge port 18 is started at a predetermined flow rate and at a predetermined temperature.

On the other hand, in step S203 shown in FIG. 8, in the case where the position of the operation lever 4 detected by the accelerometer 20 is not zero, or in other words, in the case where the position of the operation lever 4 before the current human detection is a water discharge position, the process proceeds to step S205, and whether or not the position of the operation lever 4 is at or greater than the predetermined value, which is other than zero, is determined.

Then, in the case where the position is at or greater than the predetermined value, which is other than zero, in step S205, or in other words, in the case where the flow rate is set in a high flow rate region, the process proceeds to step S204 so that discharge of water is not suddenly started at a high flow rate. Then in step S204, discharge of cold water or hot water from the water discharge port 18 is started at a predetermined flow rate and at a predetermined temperature.

Next, in the case where it is determined in step S205 shown in FIG. 8 that the position of the operation lever 4 is set at less than the predetermined value, it is determined that water may be discharged with no problem, and the flow rate and the temperature are set in step S206 based on the position of the operation lever 4, and discharge of water is started.

Next, in the case where it is determined in step S202 shown in FIG. 8 that an object is not detected by the human detection sensor 206, the process proceeds to step S207, and whether or not the operation lever 4 is operated is determined.

Then, in the case where it is determined in step S207 that the operation lever 4 is operated, based on an electrical signal which is transmitted from the accelerometer 20 to the controller 22, for example, the manual flag is set to on in step S208, and the process proceeds to step S209.

Then, in step S209, in the case where the opening of each valve 12, 14 is other than zero, it is determined that a water discharge operation is performed on the operation lever 4 while water is being discharged, and the process proceeds to step S206. In step S206 following step S209, the opening of each valve 12, 14 is set according to a water discharge position and a temperature position of the operation lever 4, and cold water or hot water is discharged from the water discharge port 18 at a predetermined flow rate and at a predetermined temperature.

Next, in the case where the opening of each valve 12, 14 is zero in step S209 shown in FIG. 8, or in other words, in the case where water is stopped, the process proceeds to step S210.

Then, in the case where it is determined in step S210 that the position of the operation lever 4 is at less than the predetermined value, it is determined that there is no problem in starting discharge of water at a set flow rate, and the process proceeds to step S206.

Then, in step S206 following step S210, the flow rate and temperature are set based on the position of the operation lever 4, and discharge of water is started.

Next, in the case where the position of the operation lever 4 is determined in step S210 shown in FIG. 8 to be at or greater than the predetermined value, it is determined that there are problems such as splashing of water if discharge of water is started at the set flow rate, and the process proceeds to step S211.

Then, in step S211, the opening of each valve 12, 14 is gradually increased over a predetermined period of time, from zero to an opening at a predetermined value corresponding to a relatively high flow rate region.

Additionally, at the time of gradually increasing the opening of each valve 12, 14 over a predetermined period of time, the opening of each valve 12, 14 may be increased over time in a stepwise manner or in a continuous manner.

Next, in the case where it is determined in step S207 shown in FIG. 8 that the operation lever 4 is not operated, whether or not power operation, such as switching off of power (not shown) of the electronic faucet device 1, is performed is determined in step S212.

Then, in the case where it is determined in step S212 that power operation is performed, the process is ended, and in the case where it is determined that power operation is not performed, the process proceeds to step S213.

Then, the manual flag is set to off in step S213, and the process returns to step S202.

Next, in step S214 following step S206 and step S211 shown in FIG. 8, whether or not the opening of each valve 12, 14 is set to zero, or in other words, whether or not the state is a water stop state, is determined.

Then, in the case where it is determined in step S214 that the opening of each valve 12, 14 is set to zero, or in other words, in the case where it is determined that water is stopped, the process proceeds to step S213, and the manual flag is set to off.

On the other hand, in the case where it is determined in step S214 that the opening of each valve 12, 14 is set to other than zero, the process proceeds to step S215, and which of on or off the manual flag is set to is determined.

Then, in the case where it is determined in step S215 that the manual flag is set to on, the process returns to step S207. Therefore, in the case where it is determined in step S207 that lever operation is performed, or in other words, in the case where lever operation is performed by the user, the process returns to step S207 without water being stopped even if human detection is not continued, and discharge of water is continued.

On the other hand, in the case where it is determined in step S215 that the manual flag is set to off, the process proceeds to step S216, and whether or not human detection by the human detection sensor 206 is continued is determined.

Next, in the case where it is determined in step S216 that human detection is not continued, the process proceeds to step S217, and the opening of each valve 12, 14 is set to zero and discharge of water from the water discharge port 18 is stopped, and then, the process proceeds to step S213, and the process returns to step S202.

On the other hand, in the case where it is determined in step S216 shown in FIG. 8 that human detection by the human detection sensor 206 is continued, the process returns to step S207.

That is, in the case where it is not determined in step S207 that lever operation is performed, or in other words, in the case where lever operation is not performed by the user, discharge of water is continued while human detection is continued, but water is stopped when human detection is discontinued.

Next, advantageous effects of the electronic faucet device 200 according to the third embodiment of the present invention described above will be described with reference to FIGS. 7 and 8.

First, with the electronic faucet device 200 according to the third embodiment of the present invention described above, in the case where a water discharge and stop operation is performed on one operation unit among the operation lever 4 and the human detection sensor 206 in a state where the water discharge and stop operation is performed on the other operation unit, the controller 22 may control each valve 12, 14 by prioritizing an electrical signal transmitted from the one operation unit, to reliably enable discharge and stopping of water at the water discharge port 18.

Accordingly, for example, in the case where discharge of water from the water discharge port 18 is desired to be started, discharge of water can be reliably started even in a state where a water stop operation is performed on one operation unit among the operation lever 4 and the human detection sensor 206, by performing a water discharge operation on the other operation unit.

Accordingly, a user having a water discharge operation in mind may certainly cause water to be discharged by operating either of the operation lever 4 and the human detection sensor 206. The user may thus be prevented from becoming confused due to intended discharge of water not being performed in spite of a water discharge operation performed by the user.

The electronic faucet device 200 with increased operability, which is easy to use and which does not cause confusion to a user at the time of operation may thereby be provided.

With the electronic faucet device 200 according to the present embodiment, the flow rate of water that is discharged from the water discharge port 18 can be adjusted by operation of the operation lever 4. Even in a case where the water discharge flow rate is set to zero by a water stop operation on the operation lever 4, discharge of water from the water discharge port 18 may be reliably started at a predetermined flow rate which is set in advance, when the controller 22 determines that a signal indicating an operation for opening each valve 12, 14 is input by a water discharge operation based on detection of an object, such as a hand or a finger of a user, by the human detection sensor 206.

Accordingly, even in a case where the water discharge flow rate is set to zero by a water stop operation on the operation lever 4, a user having discharge of water in mind may certainly cause water to be discharged, by performing a water discharge operation by causing an object, such as a hand or a finger, to be detected by the human detection sensor 206. The user may thus be prevented from becoming confused due to intended discharge of water not being performed in spite of a water discharge operation performed by the user.

With the electronic faucet device 200 according to the present embodiment, the temperature of water that is discharged from the water discharge port 18 can be adjusted by operation of the operation lever 4. Even in a case where the water discharge flow rate is set to zero by a water stop operation on the operation lever 4, discharge of water from the water discharge port 18 may be started at a temperature that is set by the operation lever 4, when the controller 22 determines that a signal indicating an operation for opening each valve 12, 14 is input by a water discharge operation based on detection of an object, such as a hand or a finger of a user, by the human detection sensor 206.

At this time, the water discharge temperature at the water discharge port 18 can be predicted to a certain degree by looking at the operation position (water discharge temperature position) of the operation lever 4. Because discharge of water from the water discharge port 18 may be started at a temperature set by the operation lever 4, a difference between the predicted water discharge temperature and the actual water discharge temperature may be suppressed, and a user may be prevented from feeling a sense of discomfort.

With the electronic faucet device 200 according to the present embodiment, when the operation lever 4 is operated after an object is detected by the human detection sensor 206, the signal transmitted from the accelerometer 20 of the operation lever 4 is prioritized, and the flow rate or temperature of discharged water may be reliably changed.

Accordingly, in the case where a water discharge operation is performed on the operation lever 4 after discharge of water at a predetermined flow rate which is set in advance is started by detection by the human detection sensor 206, a situation where the flow rate or temperature of discharged water is not changed even though a water discharge operation is performed on the operation lever 4 may be prevented, and a user may be prevented from feeling a sense of discomfort.

Water may thus be discharged at a flow rate or temperature intended by the user, and the usability may be increased.

With the electronic faucet device 200 according to the third embodiment of the present invention described above, after discharge of water at a predetermined flow rate which is set in advance is started based on detection of an object by the human detection sensor 206, if a water discharge operation is further performed on the operation lever 4 in a state where water is being discharged from the water discharge port 18, a signal indicating a water discharge operation is input from the operation lever 4 to the controller 22.

At this time, even if the human detection sensor 206 no longer detects an object, and a signal indicating a water stop operation is input from the human detection sensor 206 to the controller 22, the controller 22 may prioritize the signal indicating a water discharge operation from the operation lever 4, and discharge of water may be continued.

Accordingly, water may be prevented from being unintentionally stopped for a user who operated the operation lever 4 with the intention of continuing discharge of water, and the usability is high.

With the electronic faucet device 200 according to the present embodiment, in a case where a water stop operation is performed on one of the operation lever 4 and the human detection sensor 206 in a state where water is being discharged from the water discharge port 18, each valve 12, 14 may be reliably closed.

Accordingly, a situation may be prevented where a user intending to stop water cannot stop water even though the user is performing a water stop operation on one operation unit among the operation lever 4 and the human detection sensor 206, and the user may be prevented from feeling a sense of discomfort.

Furthermore, in the case where water is intended to be stopped, water may be reliably stopped by performing a water stop operation on either of the operation lever 4 and the human detection sensor 206, and thus, the usability is increased, and also, water is not wasted and water-saving can be achieved.

With respect to the electronic faucet device 1 according to the first embodiment of the present invention and the electronic faucet device 200 according to the third embodiment described above, a mode is described where the operation lever 4 is used as the first operation unit, and the water discharge flow rate is enabled to be changed based on an amount of operation (movement distance) of the operation lever 4 which is rotated, but with respect to the amount of operation of the operation lever 4, a change in the angle, an amount of rotation or the like of the operation lever 4 detected by the accelerometer 20 may be used to enable the water discharge flow rate to be changed, instead of the movement distance, or the water discharge flow rate may be changed based on an amount of operation of a first operation unit in a mode other than the operation lever 4.

For example, as the first operation unit in a mode other than the operation lever 4, a first operation unit allowing a press operation may be used, and the water discharge flow rate may be changed according to an amount of operation (amount of pressing) of the press operation on the operation unit. Alternatively, a first operation unit allowing a touch operation may be adopted, and the water discharge flow rate may be changed according to an amount of operation (touch duration) of a touch operation on the operation unit.

What is claimed is:
1. An electronic faucet device configured to discharge or and stop water in which a flow rate and a temperature are adjusted based on electrical signals, the electronic faucet device comprising:

a hot water passage through which hot water is supplied from a hot water supply;

a cold water passage through which cold water is supplied from a cold water supply;

a faucet main body configured to mix the hot water and the cold water supplied from the hot water passage and the cold water passage, respectively;

a water discharge port configured to discharge water mixed at the faucet main body;

an electric opening and closing valve configured to electrically open and close a passage on an upstream side of the water discharge port;

a first operation unit and a second operation unit configured to open and close the opening and closing valve;

the first operation unit being configured to allow an adjustment operation regarding a flow rate of water discharged from the water discharge port by manually operating of a user, and a control unit configured to control the opening and closing valve based on an electrical signal transmitted from each of the first operation unit and the second operation unit, wherein upon performing a water discharge or stop operation on one operation unit among the first operation unit and the second operation unit and then performing the water discharge or stop operation on the other operation unit, the control unit is configured to control the opening and closing valve by prioritizing an electrical signal transmitted from the one operation unit so as to enable discharging or stopping of water at the water discharge port, upon determining that a signal indicating an operation for opening the opening and closing valve is input by a water discharge operation on the second operation unit in a state where a water discharge flow rate of the water discharge port is set to zero by a water stop operation on the first operation unit, the control unit causes discharge of water from the water discharge port to be started at a predetermined flow rate that is set in advance, and upon determining that a water discharge operation is performed on the first operation unit after discharge of water at the predetermined flow rate that is set in advance is started by a water discharge operation on the second operation unit, the control unit is configured to change the flow rate of discharged water based on an operation on the first operation unit by prioritizing a signal that is transmitted from the first operation unit.

2. The electronic faucet device according to claim 1, wherein the first operation unit further allows an adjustment operation regarding a temperature of water that is discharged from the water discharge port, and upon determining that a signal indicating an operation for opening the opening and closing valve is input by a water discharge operation on the second operation unit in a state where a water discharge flow rate of the water discharge port is set to zero by a water stop operation on the first operation unit, the control unit causes discharge of water from the water discharge port to be started at a temperature set by the first operation unit.

3. The electronic faucet device according to claim 1, wherein the control unit further includes a flow rate setting change device that enables setting of the predetermined flow rate that is set in advance to be changed.

4. The electronic faucet device according to claim 1, wherein the second operation unit includes a detection unit configured to detect an object, the control unit causes discharge of water from the water discharge port to be continued in a state where the object is detected by the detection unit, and stops water in a state where the object is no longer detected by the detection unit, and upon determining that a water discharge operation is performed on the first operation unit in a state where discharge of water from the water discharge port at the predetermined flow rate that is set in advance is started by operation on the second operation unit, the control unit causes discharge of water from the water discharge port to be continued even in a state where the object is no longer detected by the detection unit.

5. The electronic faucet device according to claim 1, wherein upon performing a water stop operation on one of the first operation unit and the second operation unit in a state where water is discharged from the water discharge port, the control unit causes the opening and closing valve to be closed.

6. The electronic faucet device according to claim 1, wherein the first operation unit allows an adjustment operation regarding a flow rate of water that is discharged from the water discharge port, and upon inputting a signal indicating an operation for opening the opening and closing valve from the first operation unit in a state where a signal indicating an operation for closing the opening and closing valve is input from the second operation unit and the opening and closing valve is closed, the control unit determines that a water discharge operation is performed on the first operation unit, and causes discharge of water from the water discharge port to be started.

7. The electronic faucet device according to claim 6, wherein upon determining that an amount of operation of the first operation unit is at or greater than a predetermined value, the control unit causes discharge of water from the water discharge port to be started.

8. The electronic faucet device according to claim 7, wherein the control unit is configured such that, upon setting the first operation unit in a high flow rate region in which a water discharge flow rate of the water discharge port is at or higher than a predetermined flow rate, an increase in the water discharge flow rate of the water discharge port per unit time, from start of discharge of water, is reduced compared to an increase in the flow rate where setting is in a low flow rate region.

9. The electronic faucet device according to claim 7, wherein the first operation unit increases a water discharge flow rate of the water discharge port by being operated in one direction, and reduces the water discharge flow rate by being operated in the other direction, and upon determining the first operation unit to be operated in only the one direction and upon operating the first operation unit by a predetermined distance or more, the control unit causes discharge of water from the water discharge port to be started.

10. The electronic faucet device according to claim 6, wherein the control unit is capable of detecting position information of the first operation unit, and of causing water to be discharged at a water discharge flow rate according to the position information.

11. The electronic faucet device according to claim 10, wherein the first operation unit includes an accelerometer configured to detect an orientation or a rotational motion of the first operation unit.

12. The electronic faucet device according to claim 6, wherein upon performing a water stop operation on the second operation unit after discharge of water from the water discharge port is started by a water discharge operation on the first operation unit, the control unit causes the opening and closing valve to be closed.

* * * * *